(12) United States Patent
Oguro et al.

(10) Patent No.: US 6,184,647 B1
(45) Date of Patent: Feb. 6, 2001

(54) METHOD OF ESTIMATING INITIAL POLE POSITION OF PERMANENT MAGNET BRUSHLESS MOTOR

(75) Inventors: Ryuichi Oguro; Takeshi Kamei, both of Fukuoka (JP)

(73) Assignee: Kabushiki Kaisha Yaskawa Denki, Kitakyushu (JP)

( * ) Notice: Under 35 U.S.C. 154(b), the term of this patent shall be extended for 0 days.

(21) Appl. No.: 09/446,268

(22) PCT Filed: Jun. 19, 1998

(86) PCT No.: PCT/EP98/02649

§ 371 Date: Dec. 20, 1999

§ 102(e) Date: Dec. 20, 1999

(87) PCT Pub. No.: WO98/58444

PCT Pub. Date: Dec. 23, 1998

(30) Foreign Application Priority Data

Jun. 19, 1997 (JP) .................................................. P9-161470

(51) Int. Cl.[7] ...................................................... H02P 1/34
(52) U.S. Cl. .......................... 318/727; 318/723; 318/722; 318/724; 318/138; 318/439; 318/254; 318/801
(58) Field of Search ..................................... 318/727, 723, 318/722, 724, 138, 254, 439, 801

(56) References Cited

U.S. PATENT DOCUMENTS

| | | | |
|---|---|---|---|
| 6,043,624 | * | 3/2000 | Masaki et al. ........................ 318/723 |
| 6,121,706 | * | 9/2000 | Nashiki et al. ....................... 318/723 |

* cited by examiner

Primary Examiner—Karen Masih
(74) Attorney, Agent, or Firm—Morgan, Lewis & Bockius LLP

(57) ABSTRACT

In order to estimate a magnetic pole position of a permanent magnet type brushless motor, the following steps are conducted. A given γ axis and a given δ axis in an advanced from the γ axis by an electrical angle of 90° are set. A closed-loop electric current control system in the γ axis direction is formed while forming an open-loop electric current control system in the δ axis direction. It is calculated an interference current generating in the δ axis direction when a current command in the γ axis direction is given as a stepwise alternating current command. The γ axis is finely advanced by an angle of Δθ when a sign of a product of an integral value of the interference current and a value of the current command in the γ axis direction is positive. Alternatively, the γ axis is finely delayed by an angle of Δθ when the sign is negative. Thereby, the γ axis is made accord with either a d axis as a true magnetic axis or with a -d axis advanced by 180° from the true magnetic axis.

1 Claim, 5 Drawing Sheets

θe - fγ CHARACTERISTICS

METHOD OF ESTIMATING INITIAL POLE POSITION OF PERMANENT MAGNET BRUSHLESS MOTOR

TECHNICAL FIELD

The present invention relates to a method of detecting the initial magnetic pole position of a permanent magnet type brushless motor and more particularly to a method of detecting the magnetic pole position of a rotor when a sensorless brushless motor is started.

BACKGROUND ART

In conventional brushless motors, use has been made of a method of detecting a magnetic pole position with omission of a magnetic-pole-position detecting sensor which is constituted of a resolver or a Hall-effect device.

When the rotation of a rotor is allowed at the time of starting in reference to a method of the sort mentioned above for detecting a magnetic pole position, it is possible to utilize a technique, as disclosed in Japanese Patent Publication No. 3-239186A, for determining a rotor position (the magnetic pole position) by switching between a synchronous operation mode wherein steady operation is performed and a rotor-position detecting mode wherein the magnetic pole position is detected, rotating the rotor by supplying such a gate pulse as to generate a rotating magnetic field in each three-phase armature coil at the time of starting a brushless motor and then causing a position detecting circuit to detect the voltage induced in the armature coil.

When the rotation of the rotor is not allowed at the time of starting, that is, when the magnetic pole position is estimated with the motor unoperated, there is a technique, as proposed in IEEJ IAS Vol. 116-D, No. 7, pp. 736–742 (1996) for determining the magnetic pole position with the motor unoperated by supplying intermittent pulse-like voltage commands sequentially in a given direction to the extent that the motor is unrotated, and estimating a position angle from a difference of response, which varies in an anti-sinusoidal wavelike manner, of each of the phase currents $i\alpha_u$ and $i\beta_u$, $i\alpha_v$ and $i\beta_v$, $i\alpha_w$ and $i\beta_w$, etc., which are converted into the static coordinates.

However, there still exist the following problems in the aforesaid prior art. The technique disclosed in Japanese Patent Publication No. 3-239186 is not applicable to a motor which makes it a condition that its rotor is at a standstill before the operation of the motor because the motor has to be started by rotating the rotor in order to determine the rotor position.

In the case of the technique made known by the IEEJ IAS Vol. 116-D, No. 7, electrical parameters such as the inductance of the brushless motor, resistance values or the like are needed to obtain the difference of the current response by deriving each of the phase currents $i\alpha_u$, $i\alpha_v$, $i\alpha_w$ or the like from a three-phase voltage equation. Consequently, the degree of difference of the current response is unclear in case these parameters remain unknown and since the voltage command is not a stepwise alternating command, overcurrent may flow, depending on the form of the voltage command, or the rotor may be rotated; thus, there arise problems in view of its practical use.

It is therefore an object of the present invention to provide a method of estimating the initial magnetic pole position of a permanent magnet type brushless motor adapted so that even though electrical parameters are not accurately acquired, the initial magnetic pole position of a rotor in the brushless motor can be estimated quickly without allowing overcurrent to flow and without rotating the rotor, namely, without operating the motor.

DISCLOSURE OF THE INVENTION

In order to accomplish the object above, there is provided a method of estimating a magnetic pole position of a permanent magnet type brushless motor comprising the steps of:

setting a given γ axis and a given δ axis in an advanced from the γ axis by an electrical angle of 90°;

forming a closed-loop electric current control system in the γ axis direction while forming an open-loop electric current control system in the δ axis direction;

calculating an interference current generating in the δ axis direction when a current command in the γ axis direction is given as a stepwise alternating current command;

advancing finely the γ axis by an angle of Δθ when a sign of a product of an integral value of the interference current and a value of the current command in the γ axis direction is positive;

delaying finely the γ axis by an angle of Δθ when the sign is negative; and making thereby the γ axis accord with either a d axis as a true magnetic axis or with a −d axis advanced by 180° from the true magnetic axis.

In the method, a characteristic equation with respect to the response of the interference current $i_\delta$ in the δ axis direction under a condition of which the velocity of the permanent magnet type motor is zero is expressed by the following equation (1):

$$\frac{d}{dt}\begin{bmatrix} i_\gamma \\ i_\delta \end{bmatrix} = -\frac{R_s}{L_d L_q}\begin{bmatrix} L_q + (L_d - L_q)\sin^2\theta_e & \frac{1}{2}(L_q - L_d)\sin2\theta_e \\ \frac{1}{2}(L_q - L_d)\sin2\theta_e & L_d - (L_d - L_q)\sin^2\theta_e \end{bmatrix}\begin{bmatrix} i_\gamma \\ i_\delta \end{bmatrix} + \frac{1}{L_d L_q}\begin{bmatrix} L_q + (L_d - L_q)\sin^2\theta_e & \frac{1}{2}(L_q - L_d)\sin2\theta_e \\ \frac{1}{2}(L_q - L_d)\sin2\theta_e & L_d - (L_d - L_q)\sin^2\theta_e \end{bmatrix}\begin{bmatrix} v_\gamma \\ v_\delta \end{bmatrix} \quad (1)$$

Here, $i_\gamma$: current in the γ axis direction;

$i_\delta$: current in the δ axis direction;

$v_\gamma$: voltage in the γ axis direction;

$v_\delta$: voltage in the δ axis direction;

$L_q$: q axis inductance;

$L_d$: d axis inductance;

$R_s$: stator resistance; and $\theta_e$: electrical angular error between the γ axis and the d axis.

In this case, with the formation of an open-loop current system in the q axis direction and the formation of a proportionally-controlled closed-loop current control system, the γ axis-current command value comes to $i_{\gamma Ref}$, $V_\delta = 0$, $V_\gamma = K_\gamma(i_{\gamma Ref} - i_\gamma)$, whereby the state of which the speed the permanent magnet type motor is zero is expressed by the following equation (2):

$$\frac{d}{dt}\begin{bmatrix} i_\gamma \\ i_\delta \end{bmatrix} = -\frac{R_s}{L_d L_q}\begin{bmatrix} L_q & 0 \\ 0 & L_d \end{bmatrix}\begin{bmatrix} i_\gamma \\ i_\delta \end{bmatrix} + \frac{1}{L_d L_q}\begin{bmatrix} L_q K_\gamma \\ 0 \end{bmatrix}(i_{\gamma Ref} - i_\gamma) - \quad (2)$$

$$\frac{R_s}{L_d L_q}\begin{bmatrix} L_q + (L_d - L_q)\sin^2\theta_e & \frac{1}{2}(L_q - L_d)\sin 2\theta_e \\ \frac{1}{2}(L_q - L_d)\sin 2\theta_e & L_d - (L_d - L_q)\sin^2\theta_e \end{bmatrix}\begin{bmatrix} i_\gamma \\ i_\delta \end{bmatrix} +$$

$$\frac{1}{L_d L_q}\begin{bmatrix} (L_d - L_q)K_\gamma \sin^2\theta_e \\ \frac{1}{2}(L_q - L_d)K_\gamma \sin 2\theta_e \end{bmatrix}(i_{\gamma Ref} - i_\gamma)$$

Moreover, the response of $i_\delta$ subjected to the Laplace transform is expressed by the following equation (3):

$$i_\delta(S) = \quad (3)$$

$$\frac{K_\lambda a_{\gamma\delta} S}{S^2 + [K_\gamma a_{\gamma\gamma} + R_s(a_{\gamma\gamma} + a_{\delta\delta})]S + (K_\gamma + R_s)R_s(a_{\gamma\gamma} a_{\delta\delta} - a_{\gamma\delta}^2)} i_{\gamma Ref}(S)$$

Here, $I_\delta(S)$ represents a Laplace expression of $i_\delta$, and $I_{\gamma Ref}(S)$ represents the Laplace expression of $i_\gamma$. Furthermore, $a_{\gamma\gamma}$, $a_{\delta\delta}$ and $a_{\gamma\delta}$ are indicated by the following equation (4):

$$a_{\gamma\gamma} = \frac{L_q + (L_d - L_q)\sin^2\theta_e}{L_d L_q} \quad (4)$$

$$a_{\delta\delta} = \frac{L_d + (L_d - L_q)\sin^2\theta_e}{L_d L_q}$$

$$a_{\gamma\delta} = \frac{(L_q - L_d)\sin 2\theta_e}{L_d L_q}$$

Furthermore, the integration $\int i_\delta dt$ of the interference current $i_\delta$ in the $\delta$ axis direction in the case of giving the current command in the $\gamma$ axis direction as a stepwise alternating current command is expressed by the following equation (5) on condition that $a_{\gamma\gamma}=1/Ld$, $a_{\delta\delta}=1/Lq$ and $K_\gamma$ is sufficiently large:

$$\lim_{t\to\infty}\int_0^t i_\delta dt = \frac{L_q - L_d}{2R_s}\sin 2\theta_e \cdot i_{\gamma Ref} \quad (5)$$

The product $f_\gamma$ of the integral value of the interference value and the $\gamma$ axis-current command value is expressed by the following equation (6):

$$f_\gamma = \text{sign}(i_{\gamma Ref}) \cdot \lim_{t\to\infty}\int_0^t i_\delta dt \quad (6)$$

In view of the fact that the aforesaid results, $f_\gamma$ and the axis electrical angular error $\theta_e$ between the $\gamma$ axis and the d axis constitute a $f_\gamma - \theta_e$ characteristic which varies in a substantially sine wave form taking the $f_\gamma$ on the x axis and the $\theta_e$ on the y axis. In this relationship, when the $\gamma$ axis is so adjusted to be advanced by only $\Delta\theta_e$ if $f_\gamma \geq 0$, and to be delayed by only $\Delta\theta_e$ if $f_\gamma < 0$, the designated $\gamma$ axis finally and gradually converges on the d axis (equivalent to $\theta_e = 0$) or $-d$ axis (equivalent to $\theta_e = 180°$) to ensure that the magnetic pole position can be estimated.

BEST MODE FOR CARRYING OUT THE INVENTION

One embodiment of the present invention will be described below with reference to the drawings.

Figure 1:
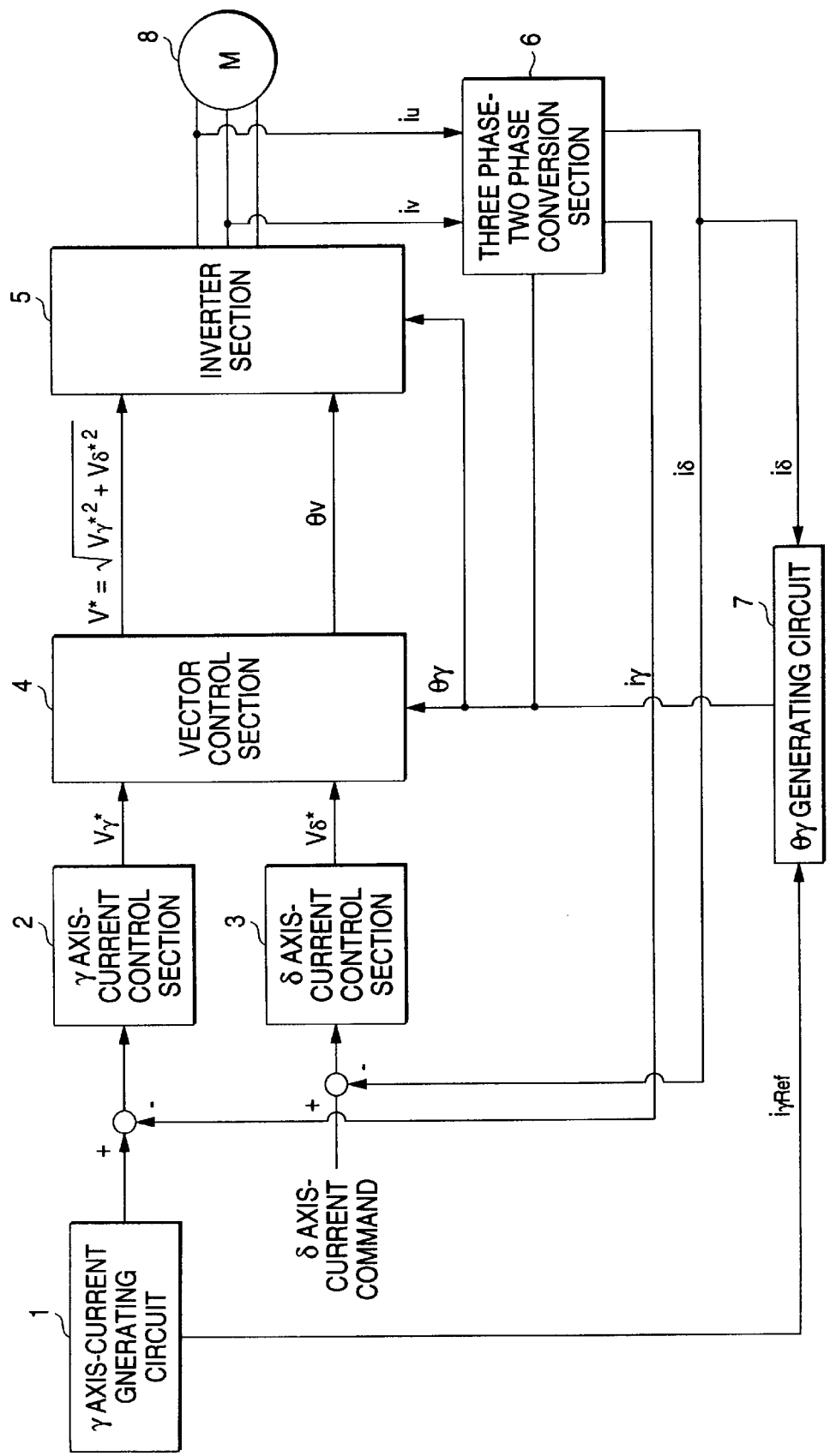
FIG. 1 is a conceptual block diagram of a method of estimating the initial magnetic pole position of a permanent magnet type brushless motor according to one embodiment of the present invention.
Figure 2:
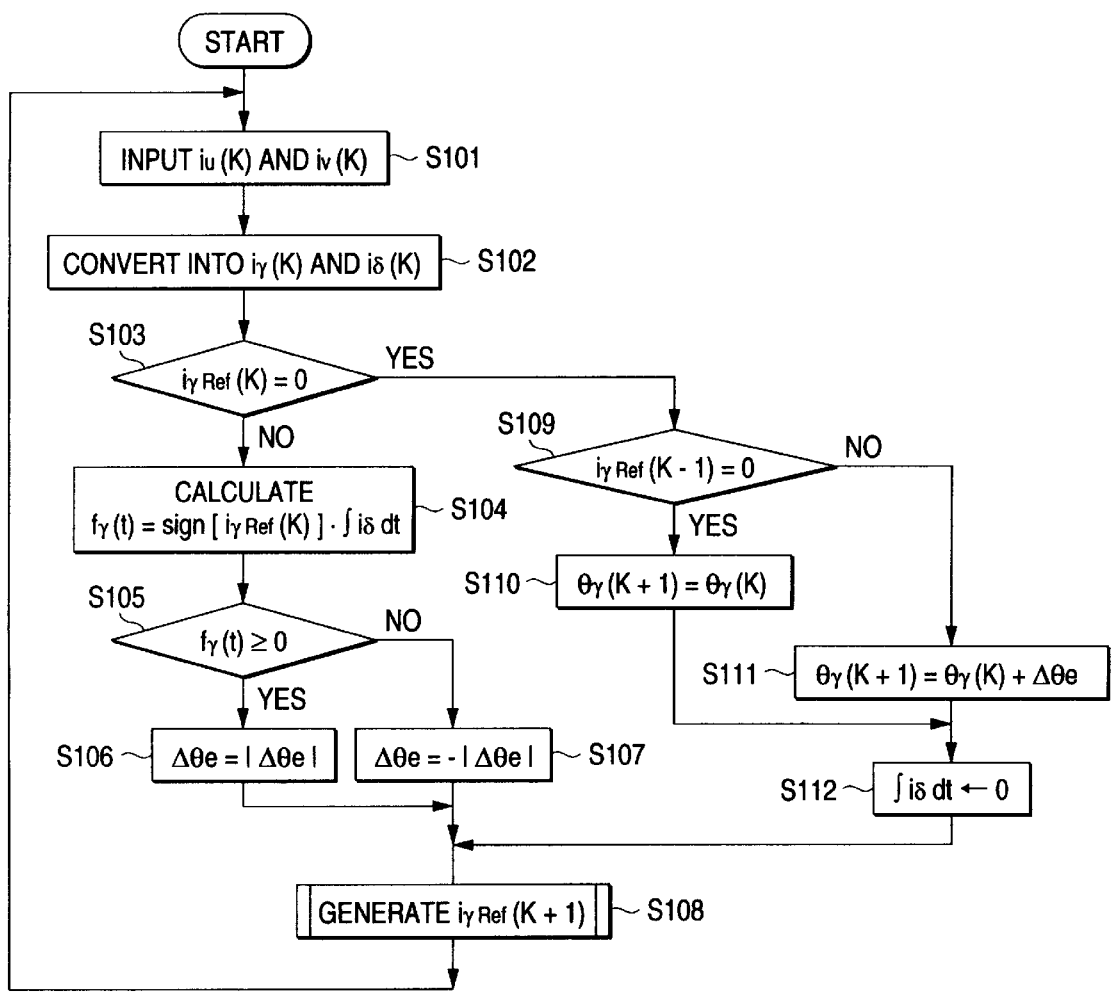
FIG. 2 is a flowchart showing the method of detecting the initial magnetic pole position of the brushless motor shown in FIG. 1.
Figure 3:
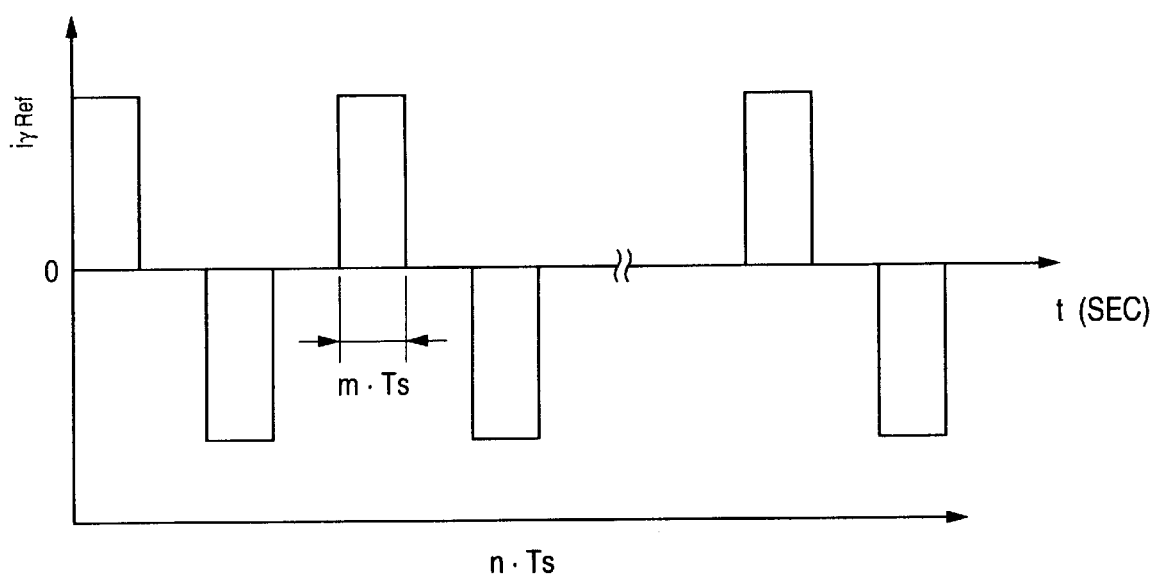
FIG. 3 is a waveform chart of the $\gamma$ axis-current command shown in FIG. 1.
Figure 4:
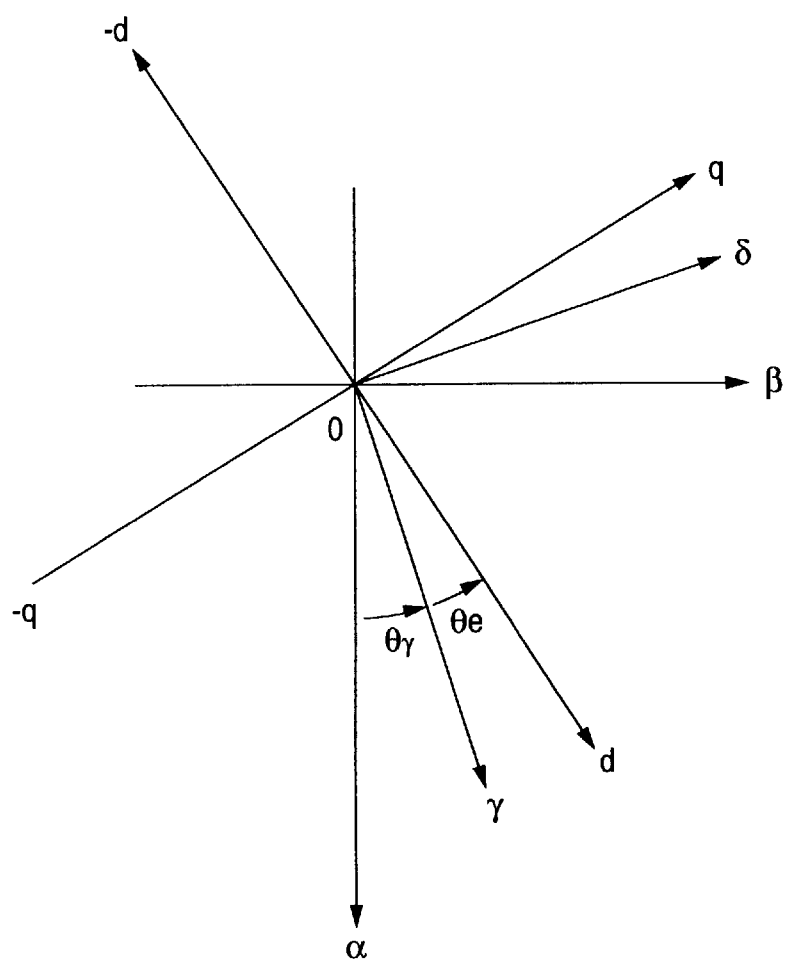
FIG. 4 is a diagram showing the relation between the $\gamma$ and d axes shown in FIG. 1.
Figure 5:
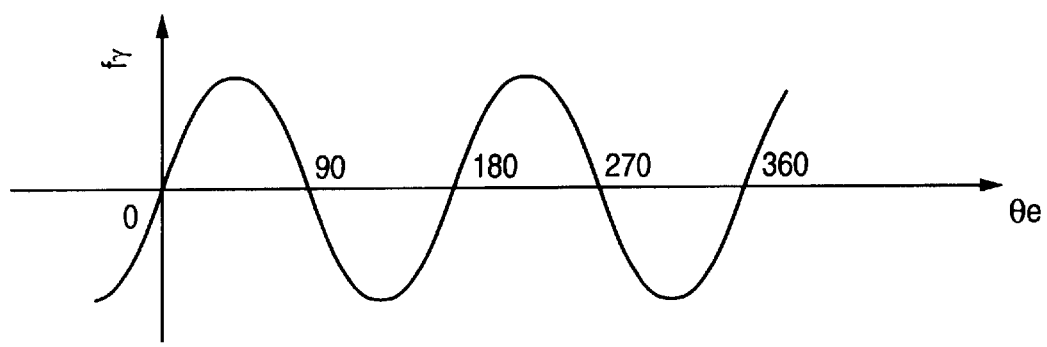
FIG. 5 is a $\theta_e - f_\gamma$ characteristic curve shown in FIG. 2.
Figure 6:
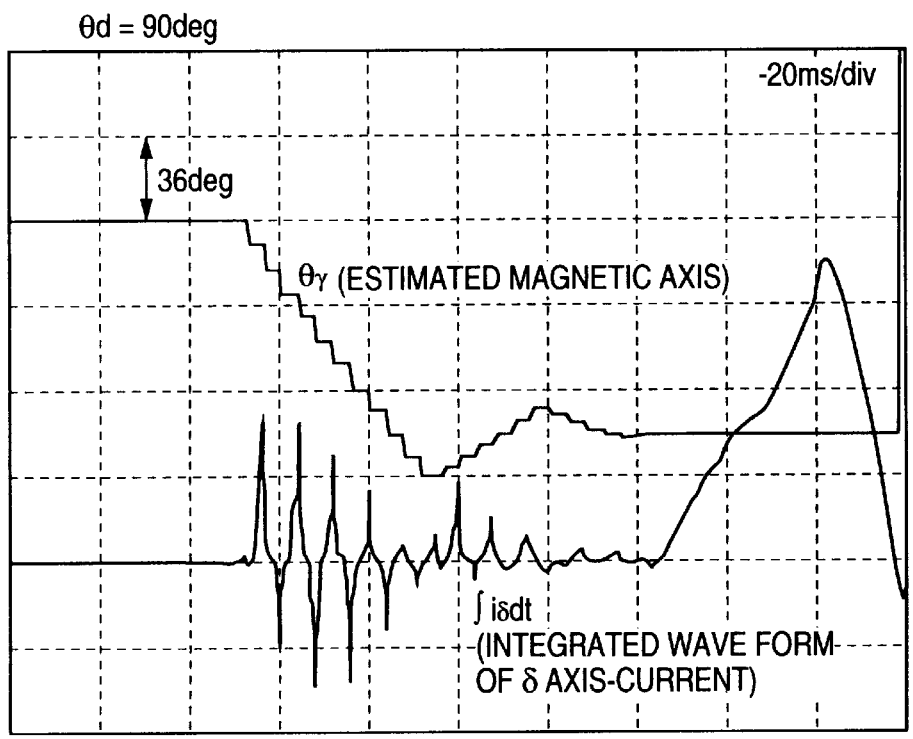
FIG. 6 is a diagram showing the corrected waveform of an estimated magnetic axis $\theta_\gamma$ shown in FIG. 2.
Figure 7:
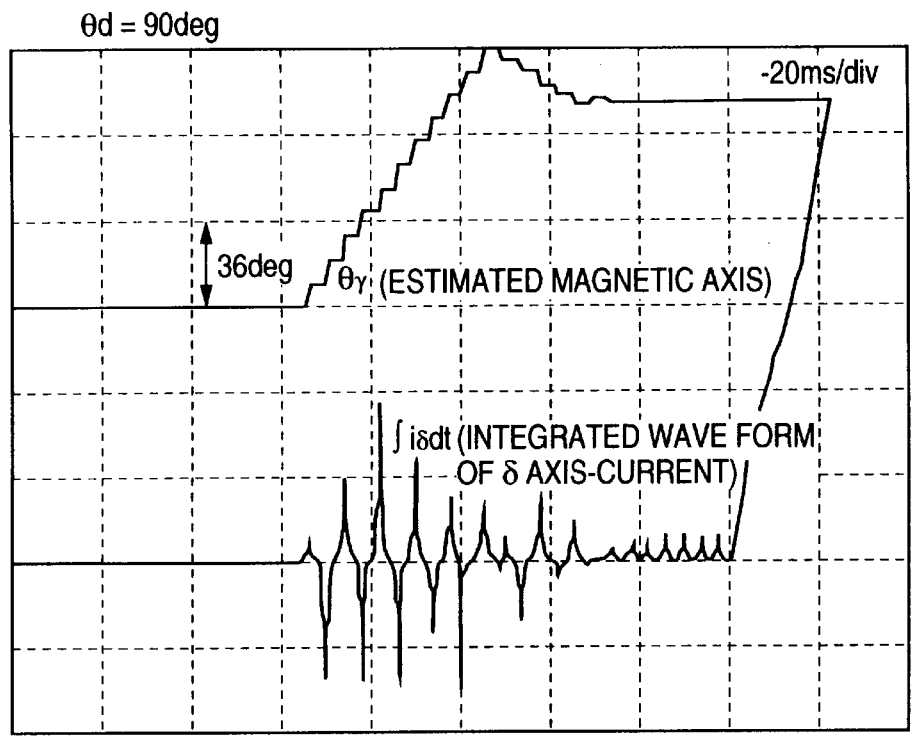
FIG. 7 is a diagram showing another-phase corrected waveform of the estimated magnetic axis $\theta_\gamma$ shown in FIG. 6.

FIG. 1 is a conceptual block diagram of a method of estimating the initial magnetic pole position of a permanent magnet type brushless motor according to one embodiment of the invention. FIG. 2 is a flowchart showing the method of detecting the initial magnetic pole position of the brushless motor shown FIG. 1. FIG. 3 is a waveform chart of the $\gamma$ axis-current command shown in FIG. 1. FIG. 4 is a diagram showing the relation between the $\gamma$ and d axes shown in FIG. 1. FIG. 5 is a $\theta_e - f_\gamma$ characteristic curve shown in FIG. 2. FIG. 6 is a diagram showing the corrected waveform of an estimated magnetic axis $\theta_\gamma$ shown in FIG. 2. FIG. 7 is a diagram showing another-phase corrected waveform of the estimated magnetic axis $\theta_\gamma$ shown in FIG. 6.

In FIG. 1, a stepwise $\gamma$ axis-current command $i_{\gamma Ref}$ as shown in FIG. 3 is outputted from a $\gamma$ axis-current generating circuit 1. A $\gamma$ axis-current $i_\gamma$ is obtained by inputting currents $i_u$, $i_v$ for driving a brushless motor 8 into an inverter section 5 via a current sensor or the like and converting the currents in a three-to-two phase conversion section 6. The $i_{\gamma Ref}$ and $i_\gamma$ are inputted to a $\gamma$ axis-current control section 2 to generate a voltage command $v_\gamma^*$.

On the other hand, a $\delta$ axis-directed voltage command $v_\delta^*$ is also generated from a $\delta$ axis-current control section 3. However, $v_\delta^*$ becomes zero because a $\delta$ axis-directed control system has an open loop gain of zero. Subsequently, in a $\theta_\gamma$ generating circuit 7 (see FIG. 4), a correction angle $\theta_e$ is determined from the $\gamma$ axis-current command $i_{\gamma Ref}$ and a $\delta$ axis-current $i_\delta$ to update a $\gamma$ axis angle $\theta_\gamma$. Accordingly, voltage command magnitude V* and an output phase $\theta_v$ are provided from a vector control section 4 to the inverter section 5, however, since $v_\delta^*$ is zero, through $V^*=|v_\delta^*|$, $\theta_v = \theta_\delta$.

Next, the operation will be described.

Referring to a flowchart of FIG. 2, at least currents in two phases out of the three-phase current of the permanent magnet type brushless motor 8, in this case, currents $i_u(K)$, $i_v(K)$ which are respectively a u-phase and a v-phase current (or any other combination of phase currents) at the time of $(K \cdot T_s)$ seconds ($T_s$: current loop sampling time) are first inputted (S101).

Subsequently, two-to-three phase conversion is carried out in accordance with a position $\theta_\gamma(K)$ (see FIG. 4) of the $\gamma$ axis away from an $\alpha$ phase to obtain $i_\gamma(K)$, $i_\delta(K)$ (S102). Then S103 is caused to branch off according to the $\gamma$ axis-current command $i_{\gamma Ref}(K)$ of the stepwise alternating current shown in FIG. 3 (S103).

In an executing routine when $i_{\gamma Ref}(K)$ is not zero then, "Sign $[i_{\gamma Ref}(K)] \cdot \int i_\delta dt$" is calculated on the basis of the decision made at S103 before being stored in $f_\gamma(t)$ (S104). At S105, S106 and S107 that follow, $\theta_{65}$ is changed by $\Delta\theta_e$ according to the sign of $f_\gamma(t)$ as shown in FIG. 4, whereby adjustment is made so as to let the γ axis accord with a d axis as a true magnetic axis.

First, a decision is made on whether $f_\gamma(t) \geqq 0$ or not and if $f_\gamma(t) \geqq 0$ is the then decided (S105: Yes), the change quantity $\Delta\theta_e$ of $\theta_\gamma$ becomes positive (S106). If $f_\gamma(t) > 0$ is the result decided (S105: No), the change quantity $\Delta\theta_e$ becomes negative (S107).

The operation of making the γ axis accord with the d axis is thus carried out and a current command $i_{\gamma Ref}(K+1)$ for $(K+1)T_s$ seconds is prepared by means of timer interruption. Then stepwise $i_{\gamma Ref}(K+1)$ is given as shown in FIG. 3 (S108).

In the case of an executing routine when $i_{\gamma Ref}(K)=0$ branching off at the preceding step S103, a decision is made on whether $i_{\gamma Ref}(K-1)=0$ or not (S109) by changing the process flow according to the preceding γ axis-current command $i_{\gamma Ref}(K-1)$. If $i_{\gamma Ref}(K-1)=0$ is the then decided (S109: Yes), $\theta_\gamma(K+1)=\theta_\gamma(K)$ is left as it is (S110). If $i_{\gamma Ref}(K-1)$ is decided to be not 0 then (S109: No), the γ axis position $\theta_\gamma$ is updated (S111) according to the $\Delta\theta_e$ determined in the executing routines at and after the preceding S104. In other words $\theta_\gamma$ is to be updated only once in the branch routines S109–S111 according to the $\Delta\theta_e$ determined at S104–S107.

Subsequently, the integral term of id is reset for the branch routines at forthcoming S104–S107.

FIGS. 6 and 7 show the results of tests actually made for adjusting $\theta_\gamma$ through the aforesaid method of estimating the magnetic pole positions under the conditions that the initial magnetic pole positions are estimated when the γ axis and the d axis are initially shifted from each other by an electrical angle of 90°, and the test results reflect the fact that the d axis or -d axis was estimated at a speed of as high as about 0.1 second.

Thus, it has become possible to obtain the initial magnetic pole position quickly by only estimating the position according to the positive and negative signs of the product of the integral value of the interference current $i_\delta$ and the γ axis-current according to this embodiment of the present invention. In the method, the use of integration for operations results in reducing tendency to be affected by the noise of current sensors. Further, stable estimated adjustment can be made since not the magnitude but only the positive or negative sign of the current polarity is necessary for making a decision, and since the inductance requires only a difference between $L_q$ and $L_d$ but is not affected by the size of the difference. Still further, since the current command $i_{\gamma Ref}$ is given alternately, the average torque is to be zero, the magnetic pole can be estimated while the motor is stopped with the rotor unrotated.

As set forth above, in order to estimate a magnetic pole position of a permanent magnet type brushless motor, the following steps are conducted. A given γ axis and a given δ axis in an advanced from the γ axis by an electrical angle of 90° are set. A closed-loop electric current control system in the γ axis direction is formed while forming an open-loop electric current control system in the δ axis direction. It is calculated an interference current generating in the δ axis direction when a current command in the γ axis direction is given as a stepwise alternating current command. The γ axis is finely advanced by an angle of $\Delta\theta$ when a sign of a product of an integral value of the interference current and a value of the current command in the γ axis direction is positive. Alternatively, the γ axis is finely delayed by an angle of $\Delta\theta$ when the sign is negative. Thereby, the γ axis is made accord with either a d axis as a true magnetic axis or with a -d axis advanced by 180° from the true magnetic axis. Therefore, even if electrical parameters such as inductance, resistance or the like are not accurately acquired, it is possible to estimate quickly the initial magnetic pole position of a rotor with the motor unoperated, that is, with the rotor unrotated.

What is claimed is:

1. A method of estimating a magnetic pole position of a permanent magnet type brushless motor comprising the steps of:

setting a given γ axis and a given δ axis in an advanced from the γ axis by an electrical angle of 90°;

forming a closed-loop electric current control system in the γ axis direction while forming an open-loop electric current control system in the δ axis direction;

calculating an interference current generating in the δ axis direction when a current command in the γ axis direction is given as a stepwise alternating current command;

advancing finely the γ axis by an angle of $\Delta\theta$ when a sign of a product of an integral value of the interference current and a value of the current command in the γ axis direction is positive;

delaying finely the γ axis by an angle of $\Delta\theta$ when the sign is negative; and making thereby the γ axis accord with either a d axis as a true magnetic axis or with a -d axis advanced by 180° from the true magnetic axis.

* * * * *

UNITED STATES PATENT AND TRADEMARK OFFICE
CERTIFICATE OF CORRECTION

PATENT NO. : 6,184,647 B1  
DATED : February 6, 2001  
INVENTOR(S) : Oguro et al.

It is certified that error appears in the above-identified patent and that said Letters Patent is hereby corrected as shown below:

<u>Title page,</u>  
Title, insert -- MAGNETIC -- after "INITIAL"; insert -- TYPE -- after "MAGNET";

PCT Filed date, change "June 19, 1998" to -- June 16, 1998 --; and  
PCT No. change "PCT/EP98/02649" to -- PCT/JP98/02649 --.

Foreign Application Priority Data, change "June 19, 1997" to -- June 18, 1997 --.

Signed and Sealed this

Ninth Day of April, 2002

Attest:

Attesting Officer

JAMES E. ROGAN  
Director of the United States Patent and Trademark Office